United States Patent
Isoda et al.

(10) Patent No.: US 8,970,076 B2
(45) Date of Patent: Mar. 3, 2015

(54) CONTROLLER-INTEGRATED ROTATING ELECTRICAL MACHINE

(71) Applicant: Mitsubishi Electric Corporation, Chiyoda-ku, Tokyo (JP)

(72) Inventors: Hitoshi Isoda, Chiyoda-ku (JP); Yoshinobu Utsumi, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 283 days.

(21) Appl. No.: 13/668,498

(22) Filed: Nov. 5, 2012

(65) Prior Publication Data

US 2013/0320786 A1 Dec. 5, 2013

(30) Foreign Application Priority Data

Jun. 5, 2012 (JP) .................................. 2012-127689

(51) Int. Cl.
*H02K 9/06* (2006.01)
*H02K 11/04* (2006.01)
*H02K 5/20* (2006.01)
(Continued)

(52) U.S. Cl.
CPC .............. *H02K 9/06* (2013.01); *H02K 11/0073* (2013.01); *H02K 11/046* (2013.01); *H02K 9/04* (2013.01); *H02K 11/0068* (2013.01); *H02K 9/02* (2013.01); *H02K 11/0021* (2013.01); *H02K 9/28* (2013.01); *H02K 5/20* (2013.01)
USPC ............ 310/59; 310/58; 310/68 B; 310/68 R; 310/89

(58) Field of Classification Search
CPC ............. H02K 5/20; H02K 5/22; H02K 9/00; H02K 9/02; H02K 9/04; H02K 9/06; H02K 9/28; H02K 11/00; H02K 11/046; H02K 11/0068; H02K 11/0073
USPC .............................. 310/58, 59, 68 B, 68 R, 89
IPC ........................................................ H02K 9/06
See application file for complete search history.

(56) References Cited

U.S. PATENT DOCUMENTS 6,740,995 B2 * 5/2004 Oohashi et al. .............. 310/68 D
6,930,424 B2 * 8/2005 Even et al. ..................... 310/201
(Continued)

FOREIGN PATENT DOCUMENTS

JP 2005-012860 A 1/2005
JP 2006-033986 A 2/2006
(Continued)

*Primary Examiner* — John K Kim
(74) *Attorney, Agent, or Firm* — Sughrue Mion, PLLC; Richard C. Turner

(57) ABSTRACT

A first cooling air passage is formed to let first cooling air generated by a cooling fan in from a radially outside of an inverter apparatus to cool a heat sink and out through exhaust holes provided on an outer peripheral side of a rear bracket by passing an inner periphery of the rear bracket. Also, a second cooling air passage is formed to let second cooling air generated by the cooling fan into a hollow portion of the inverter apparatus from an axially rear of a rotation shaft to cool a brush holder and a magnetic pole position detection sensor and out through the exhaust holes by passing the inner periphery of the rear bracket. Hence, cooling performance for the magnetic pole position detection sensor and the brush holder may be enhanced and an axial dimension may be reduced.

10 Claims, 10 Drawing Sheets

(51) Int. Cl.
*H02K 11/00* (2006.01)
*H02K 9/04* (2006.01)
*H02K 9/02* (2006.01)
*H02K 9/28* (2006.01)

(56) References Cited

U.S. PATENT DOCUMENTS

| | | |
|---|---|---|
| 6,977,475 B2 * | 12/2005 | Kuribayashi et al. ......... 318/140 |
| 7,358,699 B2 | 4/2008 | Kikuchi et al. |
| 7,545,061 B2 * | 6/2009 | Asao et al. ...................... 310/58 |
| 7,570,488 B2 * | 8/2009 | Oohashi et al. ............... 361/694 |
| 7,610,973 B2 * | 11/2009 | Asao et al. .................. 180/65.21 |
| 7,741,739 B2 * | 6/2010 | Ito .................................. 310/58 |
| 8,110,954 B2 * | 2/2012 | Maeda et al. ............... 310/68 D |
| 8,299,667 B2 * | 10/2012 | Isoda et al. .................. 310/68 D |
| 8,704,415 B2 * | 4/2014 | Kato et al. ................... 310/68 B |
| 2007/0188119 A1 * | 8/2007 | Sonoda et al. ................. 318/254 |
| 2009/0127945 A1 | 5/2009 | Hino et al. |
| 2009/0179510 A1 * | 7/2009 | Yoshida et al. ................. 310/62 |
| 2010/0283336 A1 * | 11/2010 | Vasilesco et al. ............... 310/62 |
| 2010/0301692 A1 * | 12/2010 | Shirakata et al. ............... 310/89 |
| 2011/0101804 A1 * | 5/2011 | Isoda et al. ..................... 310/64 |
| 2013/0320786 A1 * | 12/2013 | Isoda et al. ..................... 310/59 |
| 2014/0203675 A1 * | 7/2014 | Maeda et al. ................... 310/59 |

FOREIGN PATENT DOCUMENTS

| | | |
|---|---|---|
| JP | 2007-166857 A | 6/2007 |
| JP | 2010-239727 A | 10/2010 |
| JP | 2011-97806 A | 5/2011 |

* cited by examiner

CONTROLLER-INTEGRATED ROTATING ELECTRICAL MACHINE

BACKGROUND OF THE INVENTION

1. Field of the Invention

The present invention relates to a controller-integrated rotating electrical machine for vehicle formed by attaching an inverter apparatus that supplies armature windings and field windings with power to a rotating electrical machine main body on an outside in a rear of a rear bracket.

2. Background Art

An apparatus in the related art is formed by installing an inverter apparatus incorporating switching devices and a control circuit in the rear of a rear bracket forming a rotating electrical machine main body to let cooling air in from a radially outside of the inverter apparatus and out from exhaust holes provided on the radially outside of the rear bracket by passing through vent holes provided along an outer periphery of a bearing holding portion of the rear bracket, so that a heat sink of the inverter apparatus is cooled. An example of this configuration is disclosed, for example, in JP-A-2006-33986.

According to the apparatus in the related art, cooling air generated by a fan attached to a rotor is let in from a radially outside of the inverter apparatus and out from the exhaust holes provided on the radially outside of the rear bracket by passing through the vent holes provided along the outer periphery of the bearing holding portion of the rear bracket and thereby cools the heat sink of the inverter apparatus. However, a cooling air passage is formed to let cooling air in from a radially outside and out toward the radially outer periphery. This configuration raises a problem that a magnetic pole position detection sensor, a brush holder, and a rear bearing disposed in the vicinity of a center of a rotation shaft cannot be cooled sufficiently.

In addition, semiconductor switching devices for power circuit that supply a brush holder and armature windings with a current are not in a same plane and have distances in an axial direction. This configuration raises another problem that an axial dimension of the rotating electrical machine is increased and so is a size of the rotating electrical machine.

SUMMARY OF THE INVENTION

The invention is devised to solve the problems discussed above and has an object to provide a controller-integrated rotating electrical machine capable of not only enhancing cooling performance for a magnetic pole position detection sensor and a brush holder, but also reducing an axial dimension of the rotating electrical machine.

A controller-integrated rotating electrical machine according to an aspect of the invention includes: a stator and a rotor supported on a front bracket and a rear bracket, which rotor has field windings that generate a magnetomotive force and a cooling fan that generates cooling air on a rotation shaft supported in a rotatable manner on a front bearing and a rear bearing provided to the front bracket and the rear bracket, respectively; a magnetic pole position detection sensor detecting a magnetic pole position of the rotor and a brush holder enclosing brushes that pass a current through the field windings, both of which are disposed in an axially rear of the rear bearing; and an inverter apparatus passing a stator current through armature windings of the stator and having a hollow portion corresponding to the rotation shaft and the brush holder, which inverter apparatus is installed on an outside in a rear of the rear bracket and formed of stator current switching devices that pass the stator current, a substantially ring-shaped heat sink that cools the switching devices, and a control board on which is mounted a control circuit that controls the switching devices. A first cooling air passage is formed to let first cooling air generated by the cooling fan in from a radially outside of the inverter apparatus to cool the heat sink and out through exhaust holes provided on an outer peripheral side of the rear bracket by passing an inner periphery of the rear bracket. Also, a second cooling air passage is formed to let second cooling air generated by the cooling fan into the hollow portion of the inverter apparatus from an axially rear of the rotation shaft to cool the brush holder and the magnetic pole position detection sensor and out through the exhaust holes by passing the inner periphery of the rear bracket.

When configured in this manner, a temperature of the switching devices can be lowered by cooling the heat sink of the inverter apparatus with the first cooling air, and moreover, because an inner peripheral side surface of the inverter apparatus, the brush holder, and the magnetic pole position sensor can be cooled with the second cooling air flowing into the hollow portion of the inverter apparatus from the axially rear thereof, temperatures of the inverter apparatus, the brush holder, and the magnetic pole position detection sensor can be lowered, too.

The foregoing and other objects, features, aspects, and advantages of the present invention will become more apparent from the following detailed description of the present invention when taken conjunction with the accompanying drawings.

DESCRIPTION OF THE PREFERRED EMBODIMENT

First Embodiment

Figure 1:
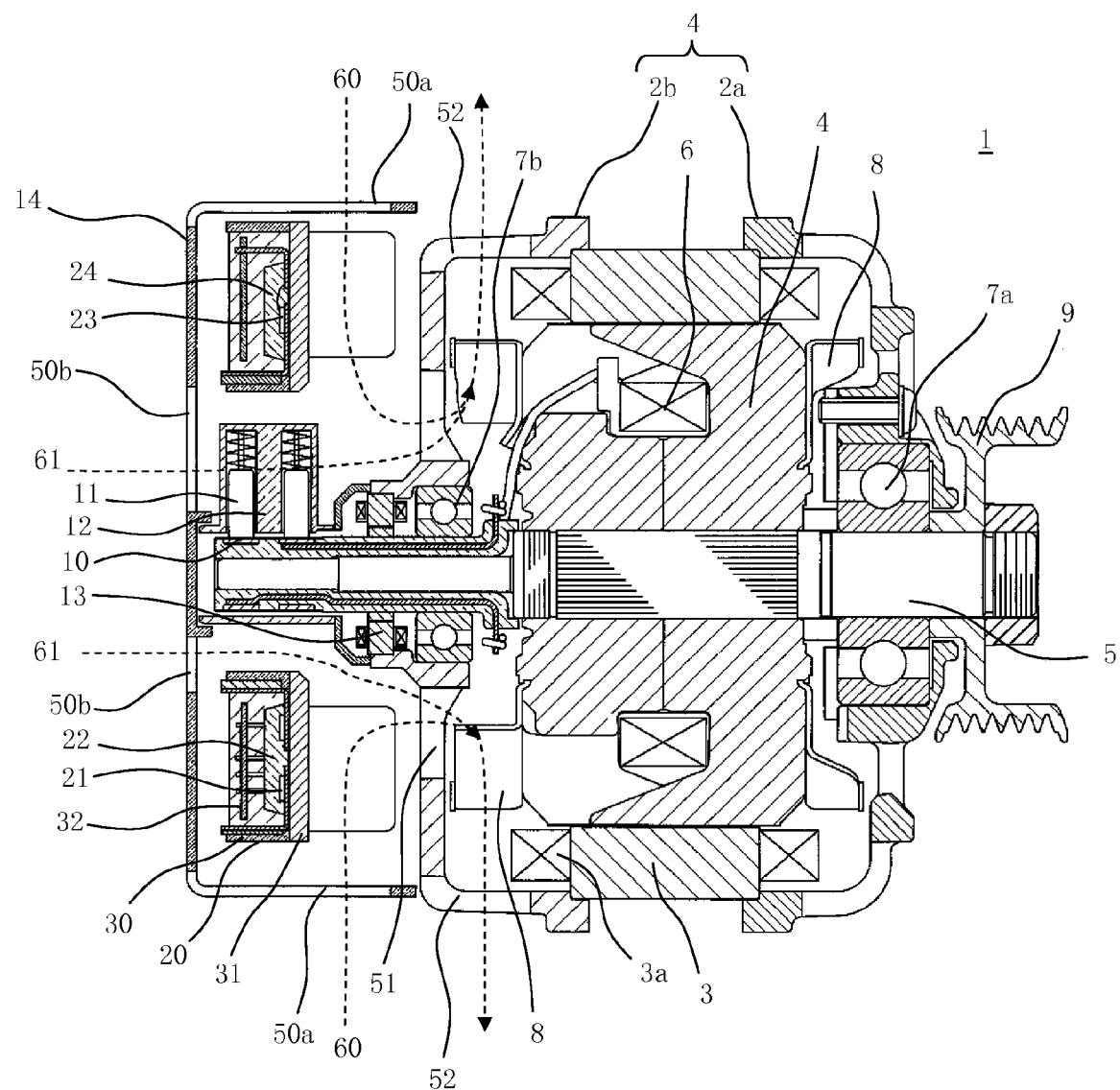
FIG. 1 is a longitudinal cross section of a controller-integrated rotating electrical machine according to a first embodiment of the invention.
Figure 2:
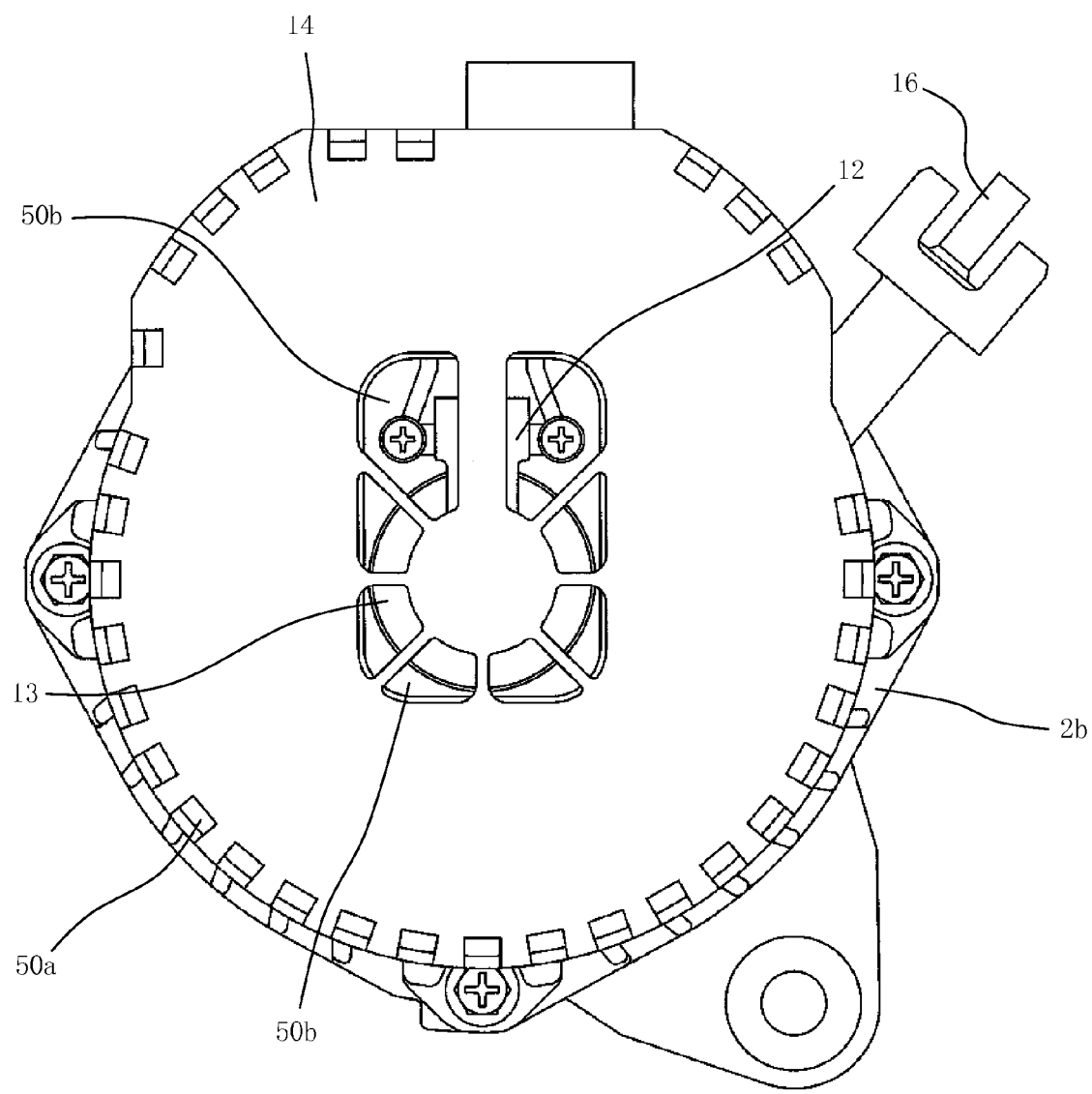
FIG. 2 is a plan view of the controller-integrated rotating electrical machine of the first embodiment when viewed from a rear side.

FIG. 1 through FIG. 11 are views showing a controller-integrated rotating electrical machine according to a first embodiment of the invention.

Referring to the drawings, a rotating electrical machine 1 includes a housing 2 formed of a front bracket 2a and a rear bracket 2b, a stator 3 having armature windings 3a, and a rotor 4 having a rotation shaft 5 and field windings 6. The stator 3 is fixedly supported on one end portion of the front bracket 2a and one end portion of the rear bracket 2b and the rotor 4 is disposed on the inside of the stator 3.

The rotation shaft 5 is supported in a rotatable manner on a front bearing 7a and a rear bearing 7b provided to the housing 2 and the rotor 4 is allowed to rotate concentrically with the stator 3.

Cooling fans 8 are fixed onto both axially end faces of the rotor 4. A pulley 9 is attached to the rotation shaft 5 at an end portion on a front side (on the outside of the front bracket 2a) and a pair of slip rings 10 is attached to the rotation shaft 5 on a rear side. A pair of brushes 11 coming into sliding contact with the slip rings 10 is disposed within a brush holder 12.

The brush holder 12, the brushes 11, and the slip rings 10 are components that supply the field windings 6 with DC power.

The rotating electrical machine 1 includes a magnetic pole position detection sensor 13, an inverter apparatus 20, and an exterior cover 14 enclosing the inverter apparatus 20. The brush holder 12, the magnetic pole position detection sensor 13, and the inverter apparatus 20 are disposed on the outside in the rear of the rear bracket 2b.

The magnetic pole position detection sensor 13 is disposed between the rear bearing 7b and the brush holder 12 and attached to a rear end portion of the rear bracket 2b.

In this embodiment, a wound sensor is used as the magnetic pole position detection sensor 13 and a sensor of this type functions as a sensor when a current is passed through the windings.

Also, an outside diameter of the magnetic pole position detection sensor 13 is larger than an outside diameter of the slip rings 10.

The inverter apparatus 20 is formed of power modules 22 enclosing semiconductor switching devices 21 for power circuit used to supply the armature windings 3a with a current, a field module 24 enclosing semiconductor switching devices 23 for field circuit used to control power to be supplied to the field windings 6, a heat sink 31 used to cool a resin case 30, the power modules 22, and the field module 24, and a control board on which is disposed a control circuit that controls operations of the semiconductor switching devices 21 and 23 and the rotating electrical machine 1.

Screw holes 2b1 (four in FIG. 8) for inverter apparatus fixation are provided to the rear bracket 2b of the rotating electrical machine 1. Fixing portions 31a (four in FIG. 6) of the heat sink 31 are fixed to and held by the rear bracket 2b with bolts 15 (four in FIG. 5). Accordingly, the heat sink 31 and the rear bracket 2b are at the same potential.

Figure 4:
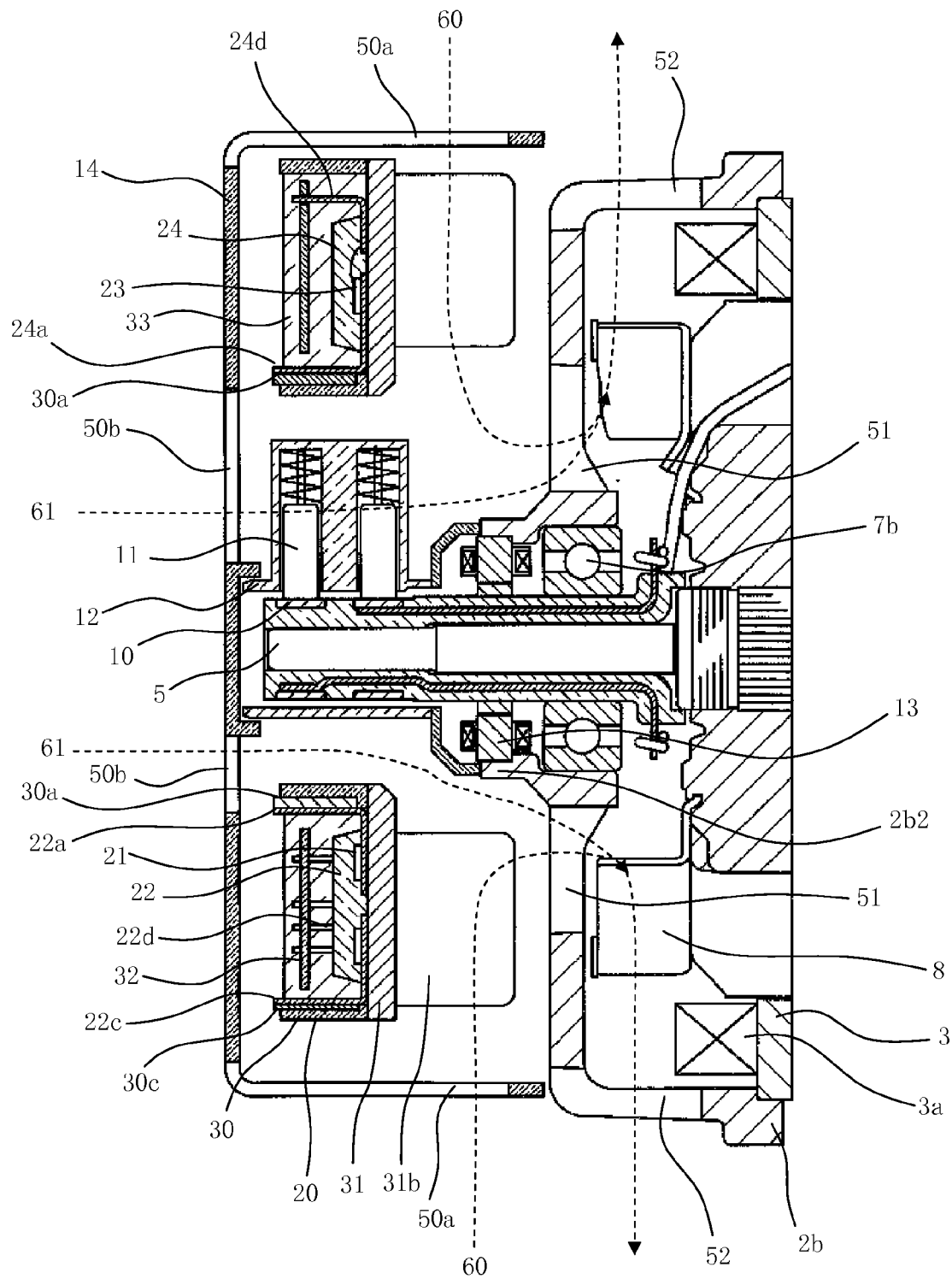
FIG. 4 is a longitudinal cross section of a major portion of the controller-integrated rotating electrical machine of the first embodiment.

As is shown in FIG. 4, the heat sink 31 has fins 31b extending toward the rear bracket 2b. The power modules 22 and the field module 24 are mounted on the heat sink 31 on an axially opposite side to the fins 31b via an insulating layer (not shown) with good thermal conductivity. The control board 32 is installed on an axially rear side of the power modules 22 and the field module 24.

Also, the power modules 22, the field module 24, and the control board 32 are enclosed in the heat sink 31 and the resin case 30. A space defined by the heat sink 31 and the resin case 30 is filled with waterproof resin 33, such as epoxy, silicon, and urethane. The power modules 22, the field module 24, and the control board 32 are therefore resin-encapsulated with the waterproof resin 33.

Figure 5:
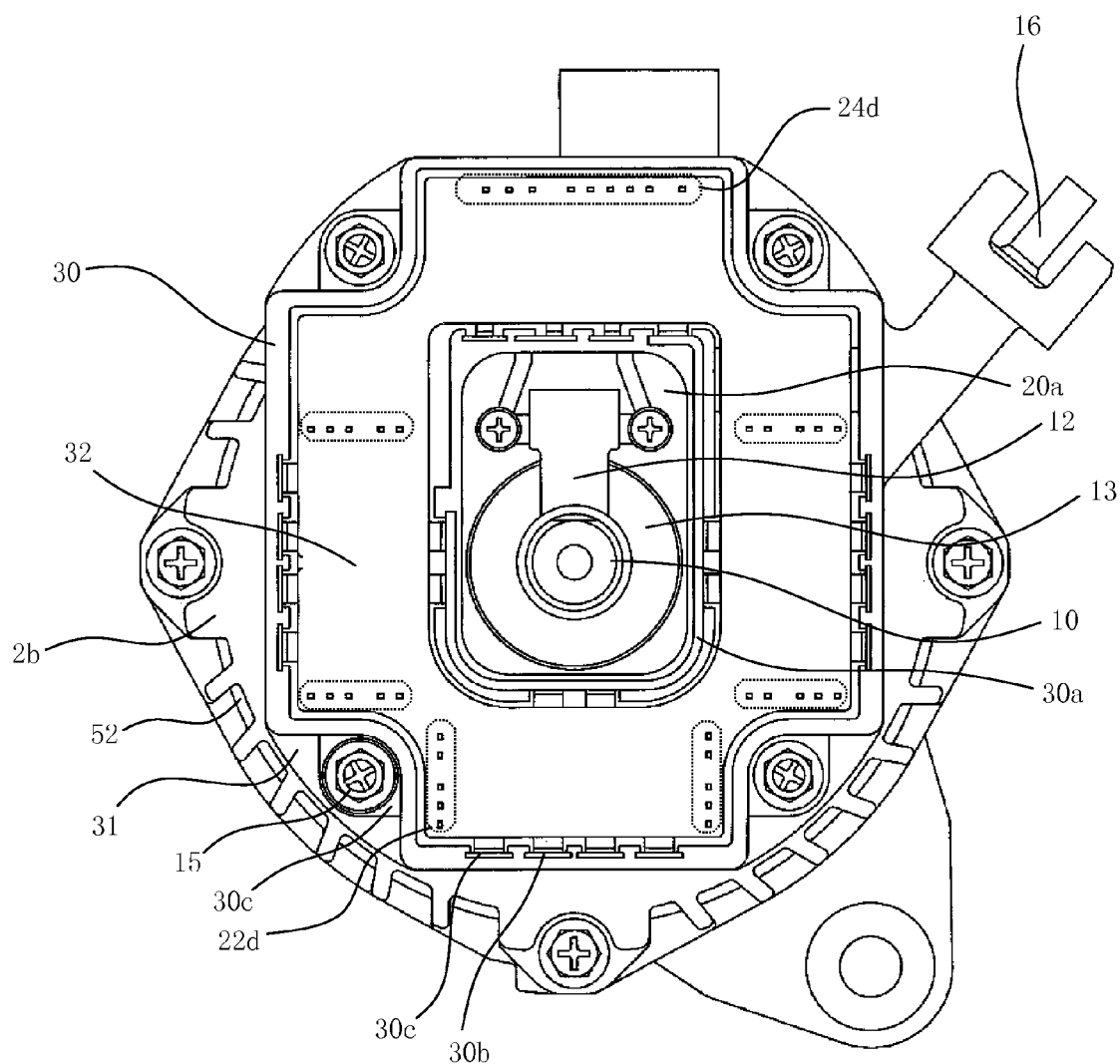
FIG. 5 is a plan view of the controller-integrated rotating electrical machine of the first embodiment excluding an exterior cover and waterproof rein when viewed from the rear side.
Figure 6:
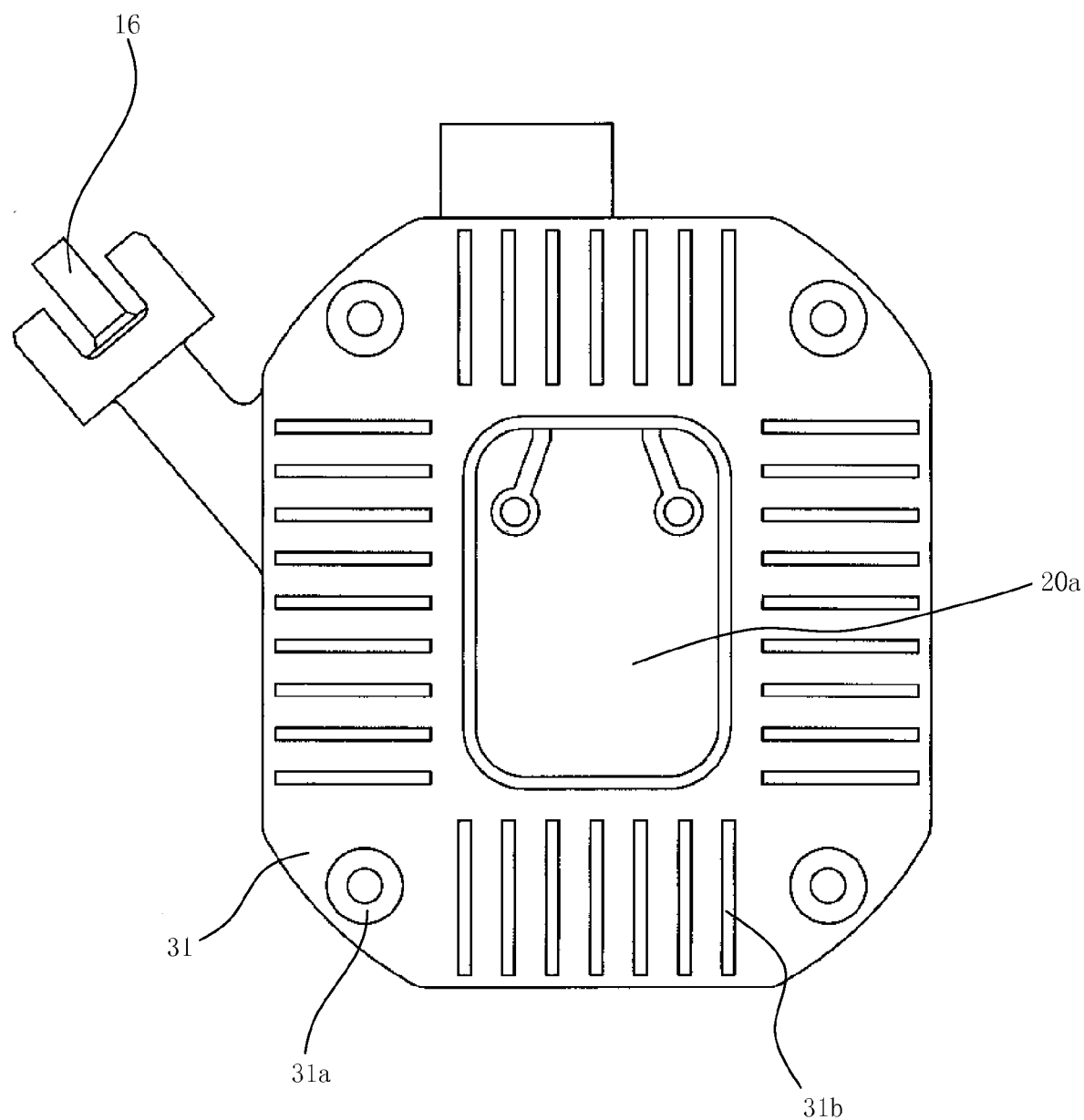
FIG. 6 is a view of a major portion of an inverter apparatus in the first embodiment excluding a control board when viewed from the rear side.

As is shown in FIG. 6, the heat sink 31 is of substantially a ring shape that is hollow in the vicinity of the rotation shaft 5. As is shown in FIG. 5, the resin case 30 is also hollow in the vicinity of the rotation shaft 5. A hollow portion 20a is formed in the inverter apparatus 20 in the vicinity of the rotation shaft 5 and the brush holder 12 is disposed in the hollow portion 20a.

In this instance, the brush holder 12 and the switching devices 21 of the power modules 22 are disposed at positions in a same plane. In this embodiment, the control board 32 is also disposed in the same plane as the brush holder 12 (FIG. 4).

In the rotating electrical machine 1 of this embodiment, the cooling fans 8 are driven when the rotor 4 is driven to rotate. Then, a first cooling air ventilation passage is formed, through which, as are indicated by arrows in FIG. 1 and FIG. 4, first cooling air 60 is let in from first cooling air inflow holes 50a provided along a radial outer periphery of the exterior cover 14 to flow into spaces among the fins 31b of the heat sink 31 present between a base surface of the heat sink 31 and a rear end face of the rear bracket 2b, bent in a centrifugal direction after passing through vent holes 51 provided along an outer periphery of a rear bearing holding portion of the rear bracket 2b, and let out from exhaust holes 52 provided on a radially outer peripheral side of the rear bracket 2b while cooling the armature windings 3a and the rear bracket 2b.

Further, besides the first cooling air ventilation passage, a second cooling air ventilation passage is also formed, through which second cooling air 61 is let in from second cooling air inflow holes 50b provided in the axially rear of the exterior cover 14 oppositely to the hollow portion 20a of the inverter apparatus 20 to pass through the hollow portion 20a of the inverter apparatus 20 and the periphery of the brush holder 12, then through the periphery of the magnetic pole position detection sensor 13 and a magnetic pole position detection sensor attachment portion 2b2 of the rear bracket 2b, bent in a centrifugal direction after passing through the vent holes 51 provided along the outer periphery of the bearing holding portion of the rear bracket 2b, and let out from the exhaust holes 52 provided on the radially outer peripheral side of the bracket 2 while cooling the armature windings 3a and the bracket 2.

By letting the first cooling air 60 pass by the fins 31b of the heat sink 31 of the inverter apparatus 20, the heat sink 31 can be cooled, which in turn makes it possible to lower temperatures of the semiconductor switching devices 21 for power circuit and the semiconductor switching devices 23 for field circuit. Moreover, by letting the second cooling air 61 pass through the hollow portion 20a of the inverter apparatus 20 and pass by the periphery of the brush holder 12 and the periphery of the magnetic pole position detection sensor attachment portion 2b2 of the rear bracket 2b, it becomes possible to lower temperatures of the inverter apparatus 20, the brushes 11, and the magnetic pole position detection sensor 13. Furthermore, by letting the second cooling air 61 pass by the periphery of the rear bearing holding portion of the rear bracket 2b, it also becomes possible to lower a temperature of the rear bearing 7b.

In a case where the brush holder 12 is disposed between the magnetic pole position detection sensor 13 and the rear bearing 7b, it becomes necessary to extend the rear bracket end portion where the magnetic pole position detection sensor 13 is attached behind the brush holder 12. The second cooling air 61 therefore passes by the radially outside of the magnetic pole position detection sensor 13 but hardly passes by the periphery of the shaft center of the brush holder 12. Hence, an effect of enhancing cooling performance for the brush holder 12 is small and so is an effect of lowering a temperature of the brushes 11. However, by disposing the magnetic pole position detection sensor 13 between the brush holder 12 and the rear bearing 7b, it is sufficient to extend the rear bracket end portion where the magnetic pole position detection sensor 13 is attached just to the front of the brush holder 12. When configured in this manner, it becomes possible to also cool the periphery of the shaft center of the brush holder 12 and an effect of lowering the temperature of the brushes 11 is significant.

In addition, the brush holder 12 is disposed in the hollow portion 20a of the inverter apparatus 20 and the semiconductor switching devices 21 for power circuit and the semiconductor switching devices 23 for field circuit are disposed at positions in the same plane as the brush holder 12. Owing to this configuration, it becomes possible to shorten an axial length of the rotating electrical machine 1, which can in turn make the rotating electrical machine 1 compact.

In this embodiment, the control board 32 is also disposed at a position in the same plane as the brush holder 12. Hence, it becomes possible to shorten an axial length of the rotating electrical machine 1 further, which can in turn make the rotating electrical machine 1 more compact.

Figure 9:
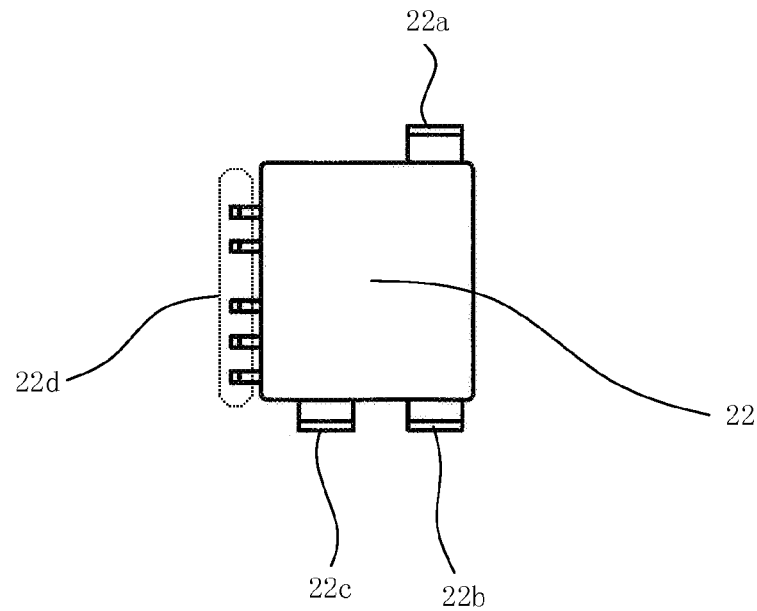
FIG. 9 is a plan view showing a power module of the inverter apparatus in the first embodiment.

Each power module 22 has a B terminal 22a at the same potential as a power input and output bolt 16 used to input and output power from and to an outside battery, an AC terminal 22b at the same potential as output lines of the armature windings 3a, a GND terminal 22c at the same potential as the rear bracket 2b, and signal line terminals 22d used to control the internal semiconductor switching devices 21. The signal line terminals 22d are directly connected to the control board 32 by soldering, pressure welding, or welding (FIG. 7 and FIG. 9).

Figure 3:
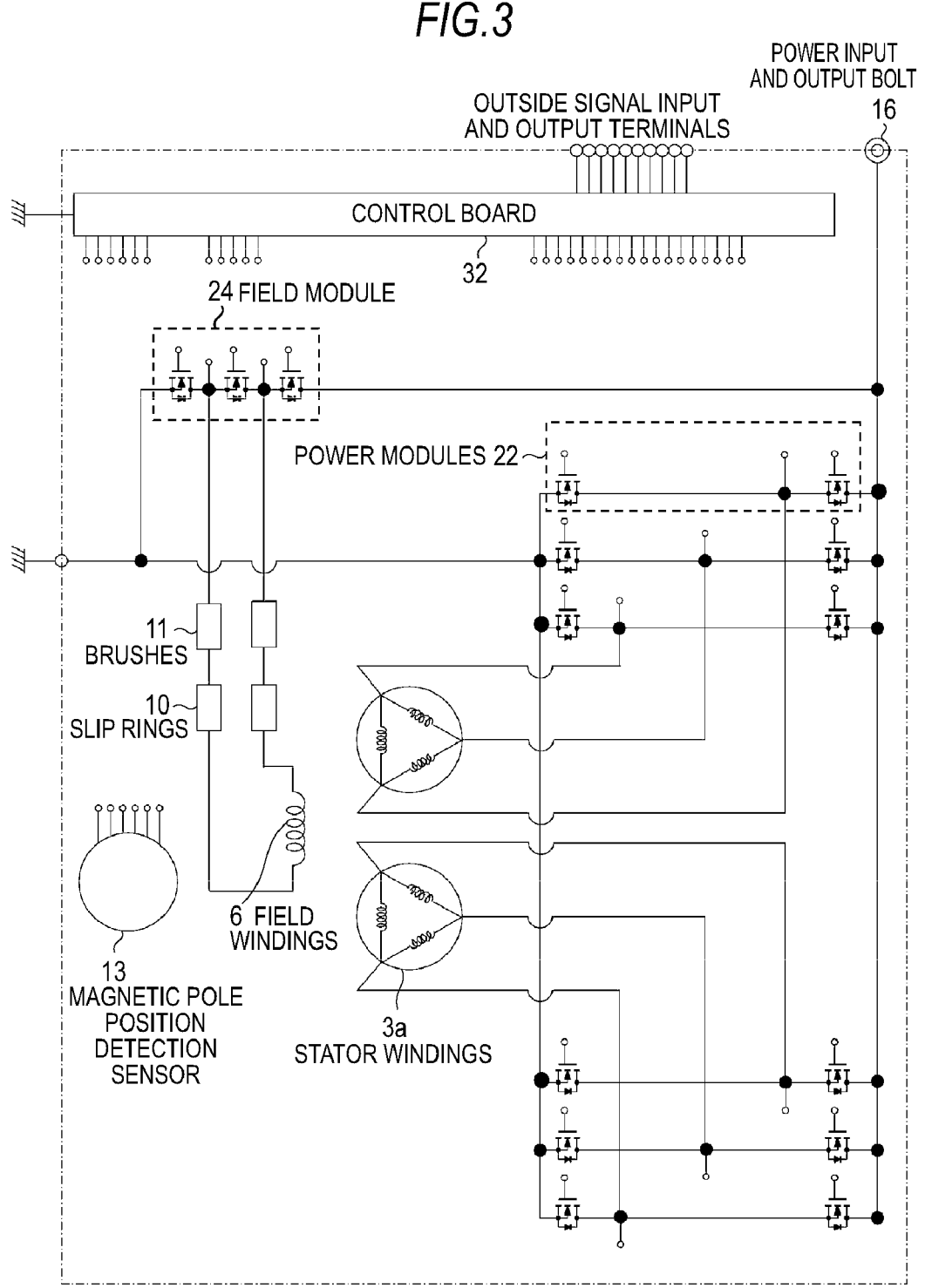
FIG. 3 is a schematic circuit diagram of the controller-integrated rotating electrical machine of the first embodiment.

As is shown in FIG. 3, six power modules 22 in total are provided for a pair of three-phase armature windings 3a and connected to respective phases in a one-to-one correspondence.

Figure 7:
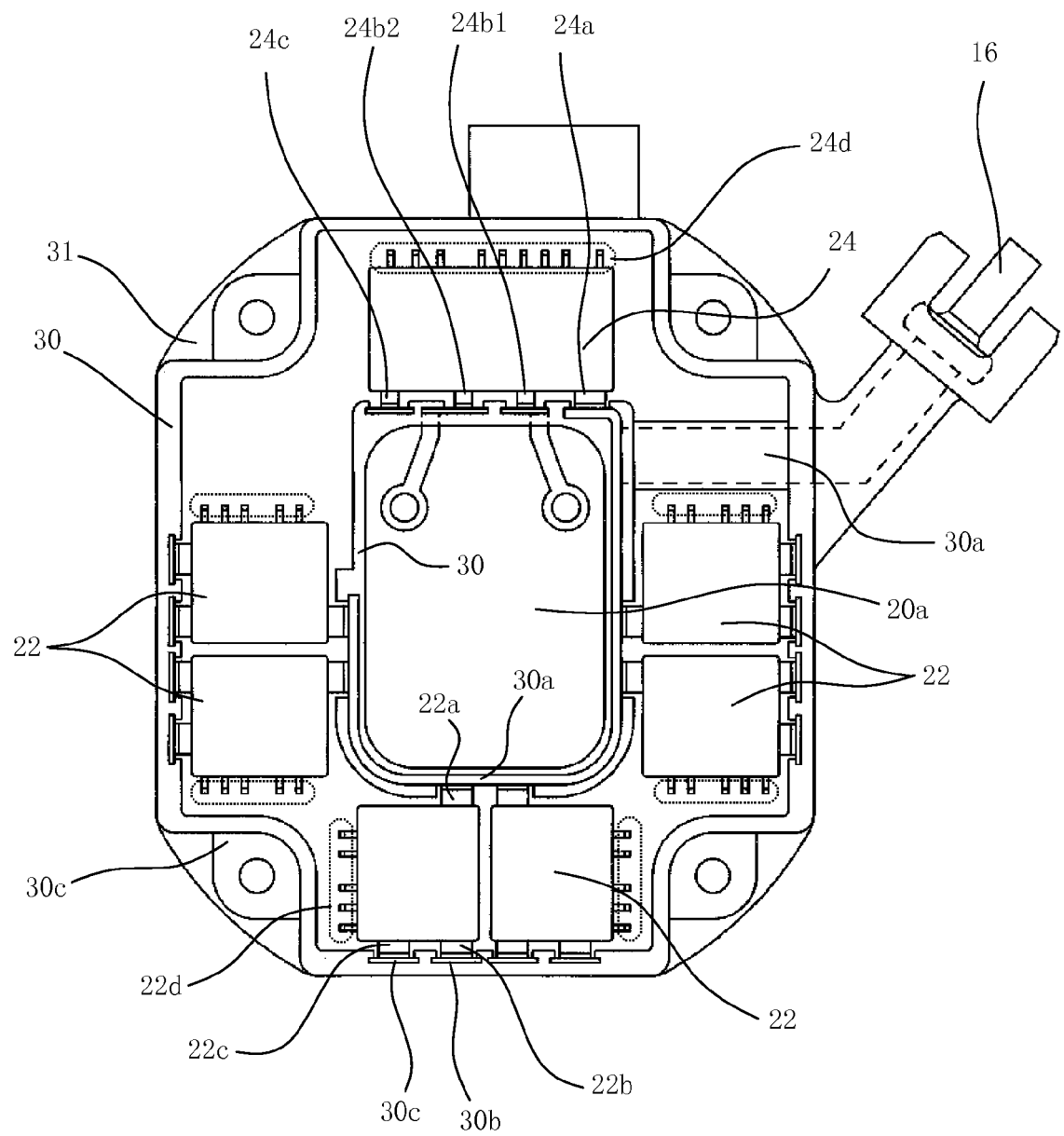
FIG. 7 is a plan view of the inverter apparatus in the first embodiment when viewed from a front side.
Figure 8:
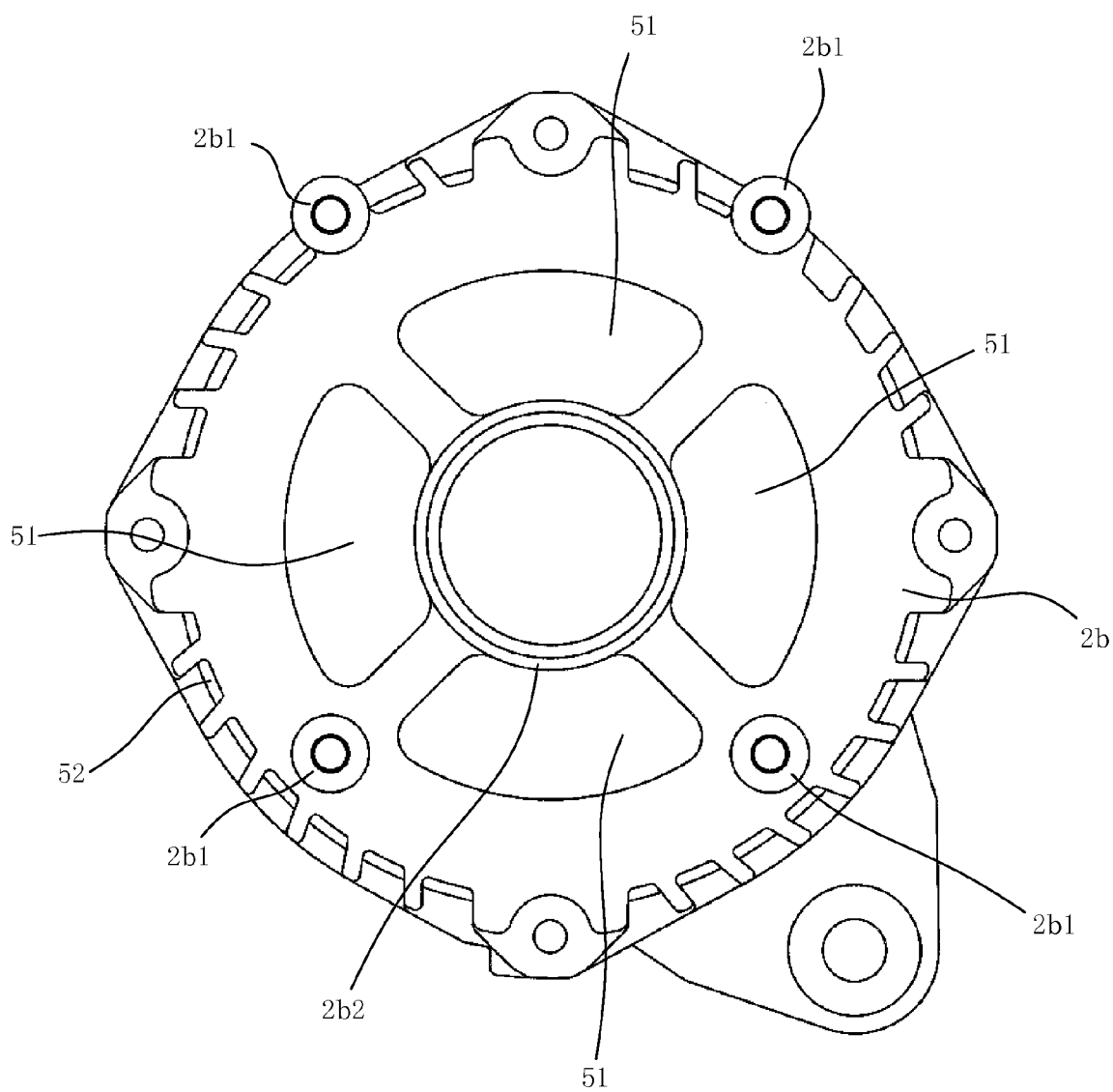
FIG. 8 is a plan view of a rear bracket of the controller-integrated rotating electrical machine of the first embodiment when viewed from the rear side.
Figure 11:
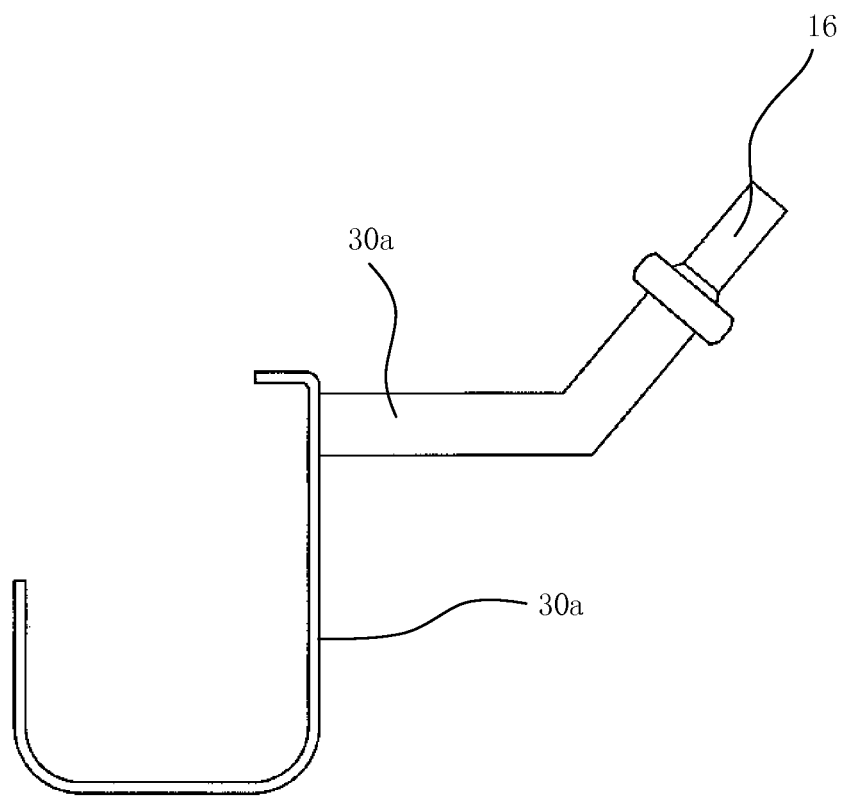
FIG. 11 is a side view showing a B terminal of a resin case and a power input and output terminal bolt in the first embodiment.

The resin case 30 is provided with B terminals 30a at the same potential as the power input and output bolt 16, AC terminals 30b at the same potential as the output lines of the armature windings 3a, and GND terminals 30c at the same potential as the rear bracket 2b by inset molding (FIG. 7). The B terminals 30a at the same potential as the power input and output bolt 16 are, as is shown in FIG. 11, formed in one piece.

The B terminal 30a is disposed on the inner peripheral side surface of the resin case 30 and connected to the B terminals 22a of the power modules 22.

Also, the AC terminals 30b and the GND terminals 30c are disposed on the outer peripheral side surface of the resin case 30. The AC terminals 30b are connected to the AC terminals 22b of the power modules 22 and the output lines of the armature windings 3a.

The GND terminals 30c are connected to the GND terminals 22c of the power modules 22 and also to the heat sink 31 or the rear bracket 2b.

In this embodiment, the GND terminals 30c of the resin case 30 are fastened by the bolts 15 together with fixing and holding portions 31a of the heat sink 31 at the same points (FIG. 5).

Figure 10:
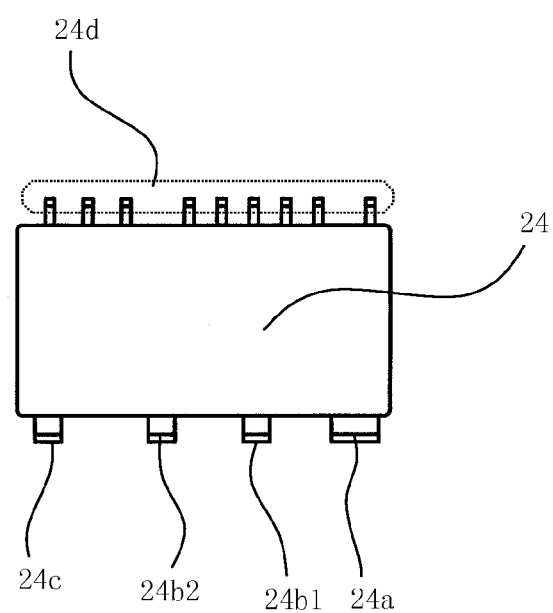
FIG. 10 is a plan view showing a field module of the inverter apparatus in the first embodiment.

Also, as is shown in FIG. 10, as with the power modules 22, the field module 24 has a B terminal 24a at the same potential as the power input and output bolt 16, a brush plus terminal 24b1 and a brush minus terminal 24b2 to pass a current through the brushes 11, a GND terminal 24c at the same potential as the rear bracket 2b, and signal line terminals 24d used to control the internal semiconductor switching devices 23. As is shown in FIG. 5, the signal line terminals 24d are directly connected to the control board 32 by soldering, pressure welding, or welding. The B terminal 24a is connected to the B terminal 30a disposed on the inner peripheral side surface of the resin case 30.

Because the signal line terminals 22d and 24d of the power module 22 and the field module 24, respectively, are directly connected to the control board 32, signal line connecting members used to connect the signal line terminals 22d and 24d to the control board 32 can be omitted. Hence, the rotating electrical machine 1 can be compact.

Alternatively, because the hollow portion 20a of the inverter apparatus 20 can be larger, it becomes possible to further enhance cooling performance for the inverter apparatus 20, the brushes 11, and the magnetic pole detection sensor 13.

Also, by disposing the B terminal 30a, the AC terminals 30b, and the GND terminals 30c on the side surfaces of the resin case 30, it becomes possible to shorten an axial length of the rotating electrical machine 1, which can in turn make the rotating electrical machine 1 compact.

The B terminal 22a of each power module 22 is connected to the B terminal 30a of the resin case 30 and is therefore connected to the power input and output bolt 16 (FIG. 7).

When the rotating electrical machine 1 performs a drive operation, a current inputted from the power input and output bolt 16 flows through the B terminal 30a of the resin case 30 and is distributed to the B terminals 22a of the respective power modules 22.

When the rotating electrical machine 1 performs a power generation operation, currents outputted from the armature windings 3a flow through the B terminals 22a of the power modules 22 and are collected to the B terminal 30a of the resin case 30, so that the collected current is outputted to the power input and output bolt 16.

Accordingly, a large current flows through the B terminal 30a of the resin case 30 and the B terminal 30a of the resin case 30 generates considerable heat. However, by disposing the B terminal 30a of the resin case 30 on the inner peripheral side surface, it becomes possible to effectively cool the periphery of the B terminal 30a of the resin case 30 with the second cooling air 61 passing through the hollow portion 20a of the inverter apparatus 20, that is, the second cooling ventilation passage. Consequently, it becomes possible to lower the temperature of the B terminal 30a of the resin case 30.

Various modifications and alterations of this invention will be apparent to those skilled in the art without departing from the scope and spirit of this invention, and it should be understood that this is not limited to the illustrative embodiments set forth herein.

What is claimed is:

1. A controller-integrated rotating electrical machine, comprising:
    a stator and a rotor supported on a front bracket and a rear bracket, said rotor having field windings that generate a magnetomotive force and a cooling fan that generates cooling air on a rotation shaft supported in a rotatable manner on a front bearing and a rear bearing provided on the front bracket and the rear bracket, respectively;
    a magnetic pole position detection sensor detecting a magnetic pole position of the rotor and a brush holder enclosing brushes that pass a current through the field windings, both of which are disposed in an area rear of the rear bearing along an axis of the rotor; and
    an inverter apparatus passing a stator current through armature windings of the stator and having a hollow portion corresponding to the rotation shaft and the brush holder, said inverter apparatus being installed at an outside area that is rear of the rear bracket and formed of stator current switching devices that pass the stator current, a substantially ring-shaped heat sink that cools the switching devices, and a control board on which is mounted a control circuit that controls the switching devices, wherein:

a first cooling air passage is formed to let first cooling air generated by the cooling fan in from an area radially outside of the inverter apparatus to cool the heat sink and out through exhaust holes provided on an outer peripheral side of the rear bracket by flowing along an inner periphery of the rear bracket; and a second cooling air passage is formed to let second cooling air generated by the cooling fan into the hollow portion of the inverter apparatus from an axially rear of the rotation shaft to cool the brush holder and the magnetic pole position detection sensor and out through the exhaust holes by flowing along the inner periphery of the rear bracket.

2. The controller-integrated rotating electrical machine according to claim 1, wherein:

the magnetic pole position detection sensor is disposed between the rear bearing and the brush holder.

3. The controller-integrated rotating electrical machine according to claim 1, wherein:

the magnetic pole position detection sensor is of a wound type that functions as a sensor when a current flows through windings and attached to a rear end of the rear bracket.

4. The controller-integrated rotating electrical machine according to claim 1, wherein:

the brush holder is disposed in the hollow portion of the inverter apparatus and the brush holder and the switching devices of the inverter apparatus are in a same plane.

5. The controller-integrated rotating electrical machine according to claim 4, wherein:

the control board of the inverter apparatus is in the same plane as the brush holder.

6. The controller-integrated rotating electrical machine according to claim 1, wherein:

the inverter apparatus is housed in a resin case and power supplying terminals are provided to an inner peripheral side surface and an outer peripheral side surface of the resin case by insert molding.

7. The controller-integrated rotating electrical machine according to claim 6, wherein:

the switching devices are included in a power module having signal line terminals that control the switching devices and power supplying terminals that pass a current through the armature windings;

the signal line terminals are directly connected to the control board; and the power supplying terminals are connected to the power supplying terminals provided to the resin case by insert molding.

8. The controller-integrated rotating electrical machine according to claim 6, wherein:

of the power supplying terminals of the resin case, a terminal at same potential as a power input and output bolt used to input and output power from and to an outside battery is disposed to the inner peripheral side surface of the resin case.

9. The controller-integrated rotating electrical machine according to claim 1, further comprising:

an exterior cover in which to enclose the magnetic pole position detection sensor and the inverter apparatus, wherein the exterior cover has cooling air inflow holes that communicate with the first cooling air passage and cooling air inflow holes that communicate with the second cooling air passage.

10. The controller-integrated rotating electrical machine according to claim 6, wherein:

a field module including field circuit semiconductor switching devices connected to the field windings is housed in the resin case.

* * * * *